United States Patent [19]
Randall

[11] 3,808,779
[45] May 7, 1974

[54] SEA HARVESTING APPARATUS AND METHOD

[75] Inventor: Alan C. Randall, Little Compton, R.I.

[73] Assignee: Sea Harvest, Inc., New York, N.Y.

[22] Filed: Feb. 17, 1972

[21] Appl. No.: 227,034

[52] U.S. Cl............................ 56/9, 37/62, 302/14, 417/169, 417/196
[51] Int. Cl............................................ A01d 45/08
[58] Field of Search....................................... 56/8, 9; 302/14–16; 37/61, 62; 417/169, 170, 196–198

[56] References Cited
UNITED STATES PATENTS

| | | | |
|---|---|---|---|
| 1,571,395 | 2/1926 | Clark | 56/9 |
| 2,144,743 | 1/1939 | Schulz | 37/62 X |
| 2,320,283 | 5/1943 | Knowlton et al. | 56/9 |
| 2,629,218 | 2/1953 | Smith | 56/9 |
| 2,907,162 | 6/1958 | Rebikoff | 56/9 |

Primary Examiner—Louis G. Mancene
Assistant Examiner—J. A. Oliff
Attorney, Agent, or Firm—Brooks Haidt & Haffner

[57] ABSTRACT

Diver from boat working along ocean bottom cuts Irish Moss, agar weed, or similar marine vegetation growing at depth of up to about 100', using a manually maneuvered sickle bar cutting unit which carries and is powered by a light weight air motor. Cutting unit further includes a collecting hood to which a flexible suction hose is attached for hydraulic delivery of the cut plants via an airlift, by which the suction is induced, to the surface and into a collecting strainer in or alongside the boat. Airlift is positioned just below the water surface and is spaced by the flexible suction hose a considerable distance away from the diver. Cutting unit air motor receives driving air, and diver receives breathing air from air compressor aboard the boat. Airlift receives driving air preferably from said air compressor, and cutting unit air motor preferably exhausts to atmospheric pressure, but said motor exhaust air could be utilized to drive airlift. Cutting unit oriented for side-to-side sweeping movement in cutting of plant stalks, and several hood configurations are described. Cutting blade has relatively short length, and air motor is relatively small. Airlift delivery tube receives driving air via a relatively large number of small diameter air apertures therethrough, the apertures being angled 20° upwardly, and the sum of their areas being 50 percent larger than the interior diameter of the delivery tube.

28 Claims, 12 Drawing Figures

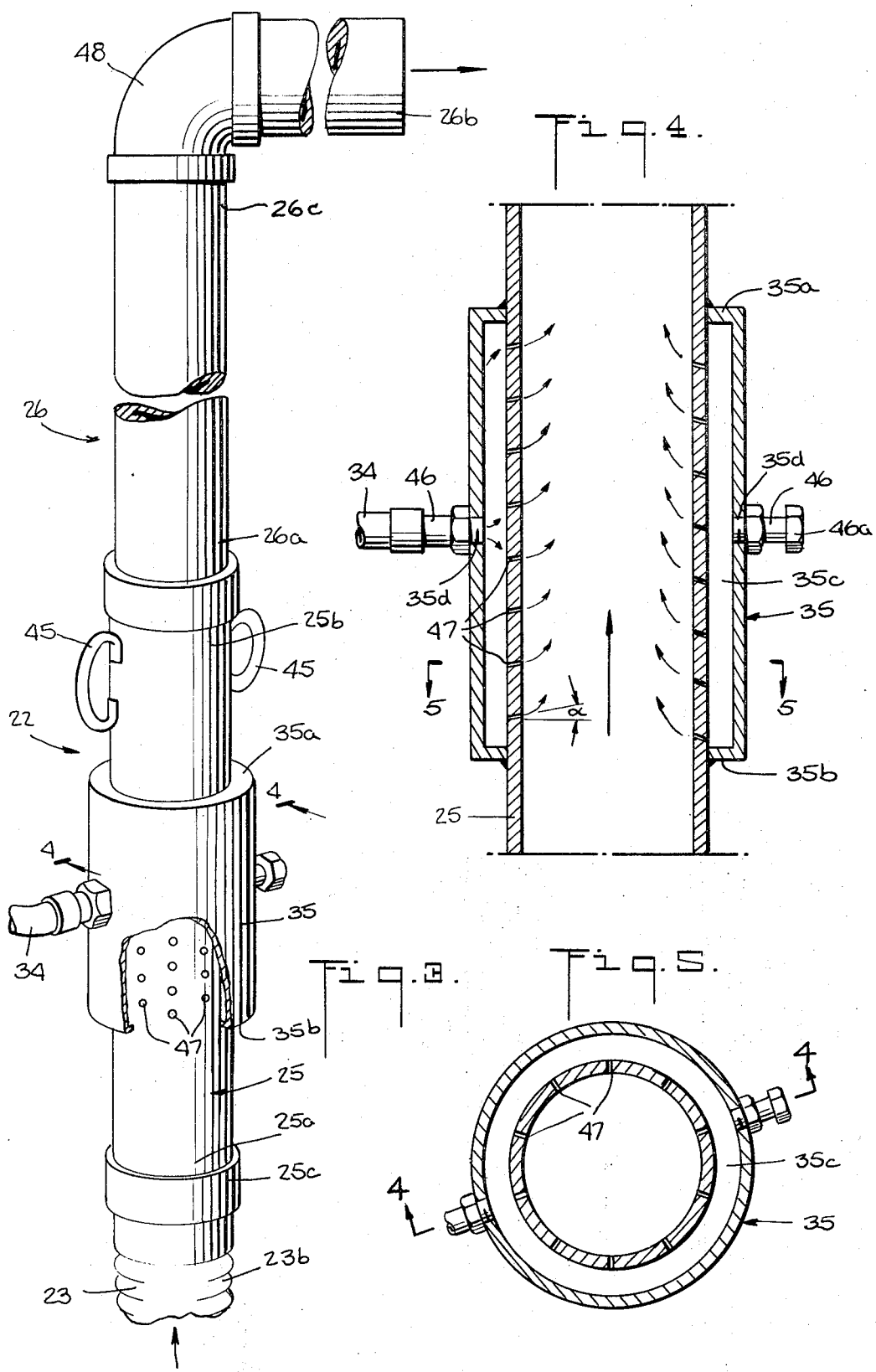

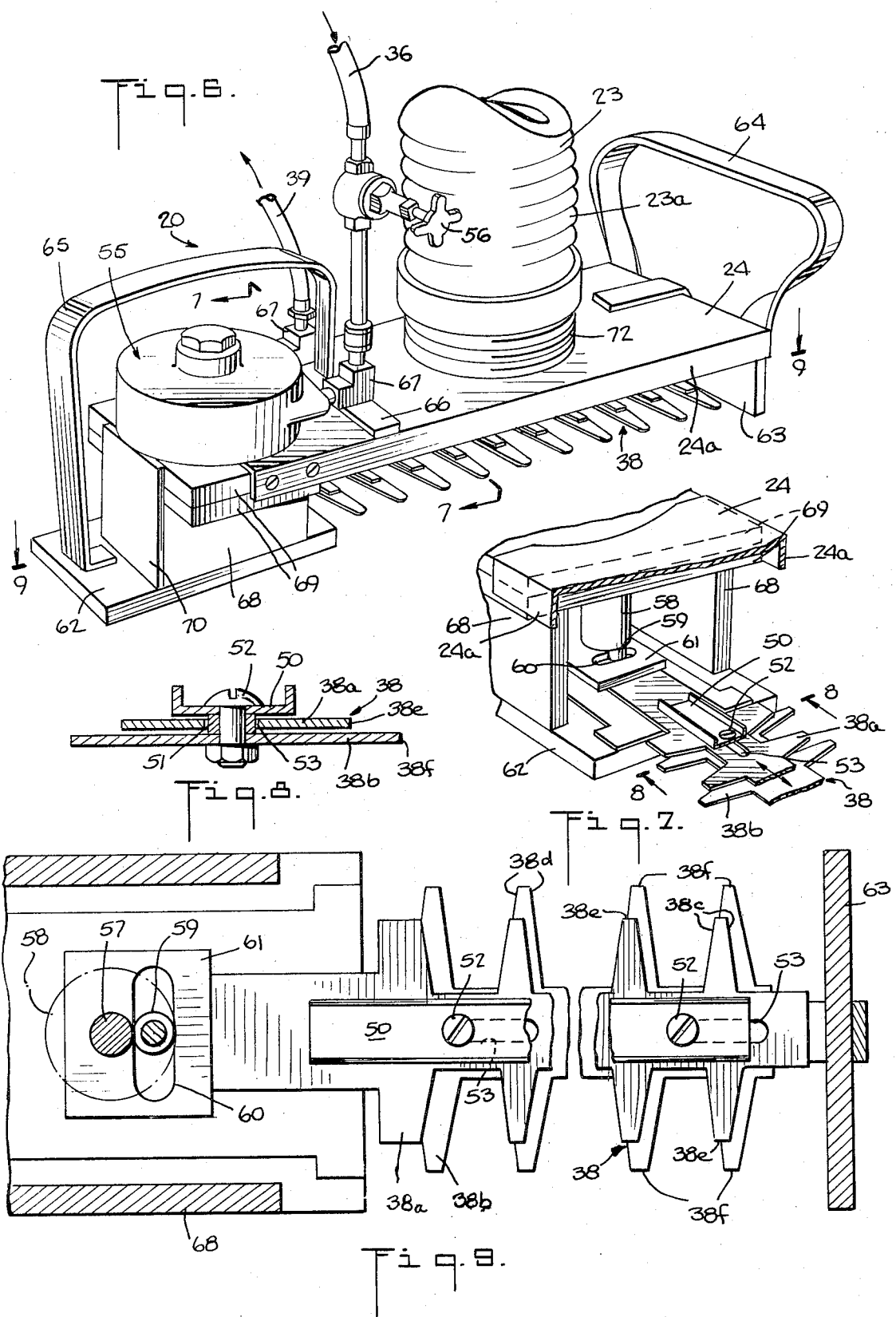

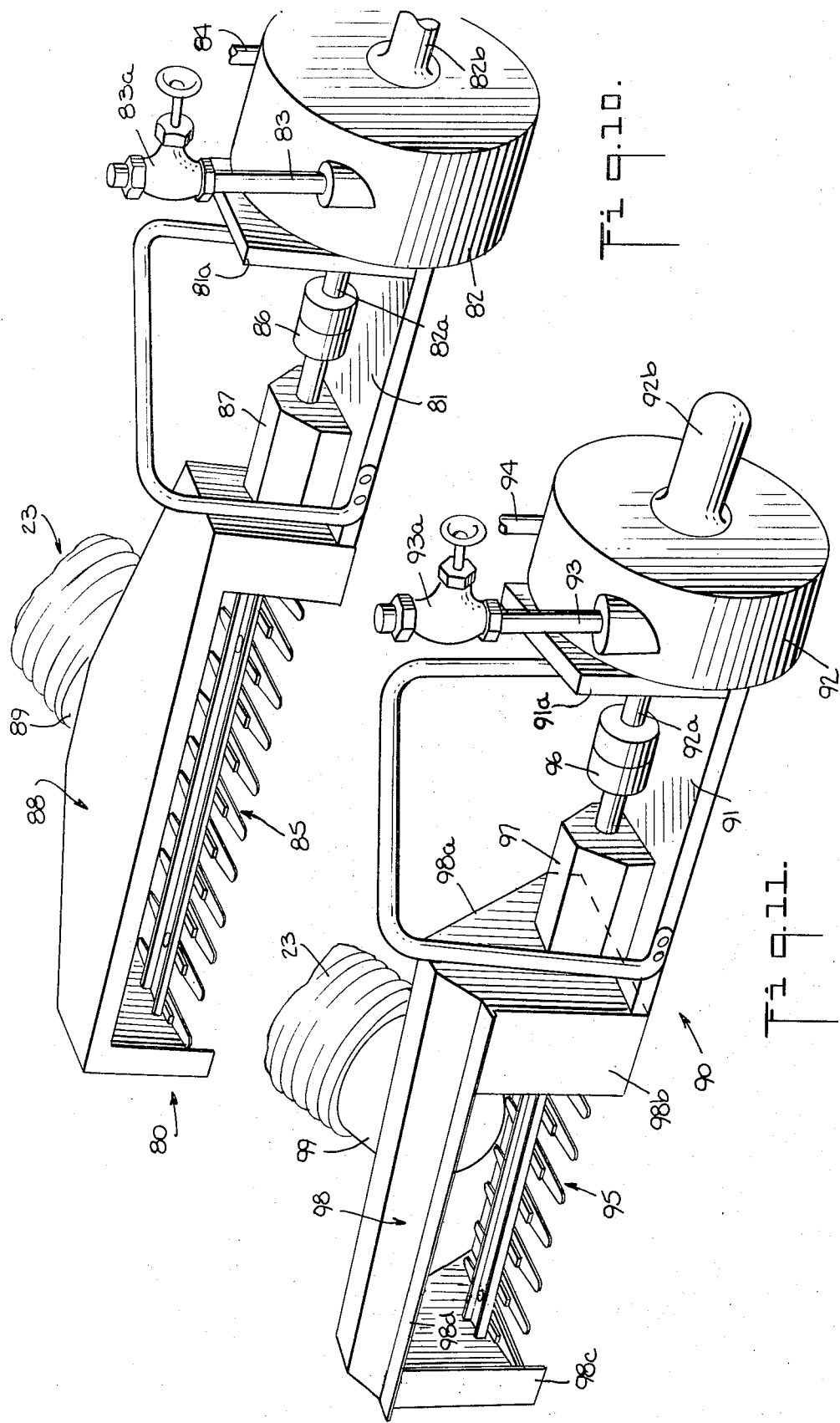

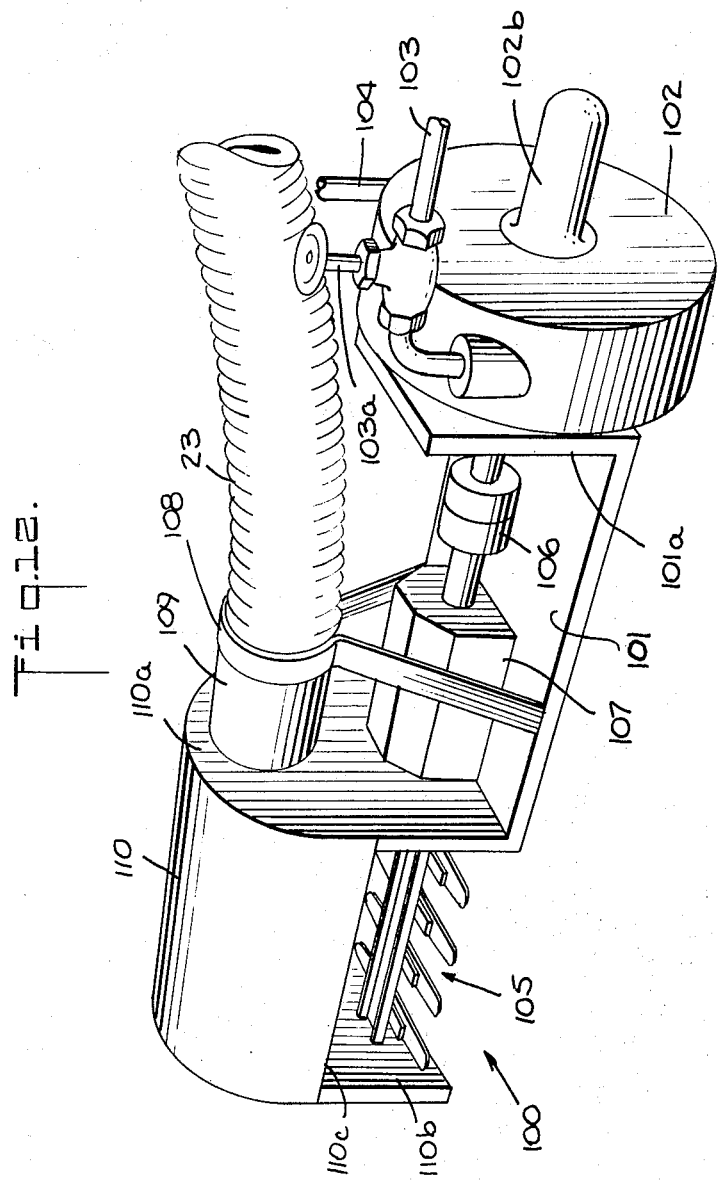

SEA HARVESTING APPARATUS AND METHOD

This invention relates to techniques for underwater harvesting of marine vegetation, and more particularly to apparatus and methods for conducting such operations.

Although the invention in one or more of its aspects may have other uses, it was made during attempts to devise an efficient and economical system for harvesting chondrus crispus, a valuable underwater growth more commonly known as Irish Moss, and therefore the invention will be described in connection with this and similar uses.

Irish Moss is a plant which grows offshore in cold-water coastal regions and is harvested at a height of from about four inches to perhaps a foot. It grows on rocky bottoms in waters up to about 40 feet deep, measured at low tide, off the coasts of Maine, the Canadian Maritime Provinces, parts of Europe such as Ireland, Scotland, Portugal, and France, and other places. Other marine growths up to about 2 feet tall which might be harvested using the invention may be found at greater depths, to perhaps one hundred feet. Plants of the Irish Moss variety grow fairly close together, and cling to the rocks by their so-called "hold fasts" or roots which should not be destroyed during the harvesting. Preservation of the "hold fast" when the plant is cut assures its rapid regrowth, as is desirable. Ideally, the plants should be harvested by cutting their thin stalks about an inch or two above their hold fasts.

Heretofore attempts have been made to devise apparatus for efficiently and economically harvesting such underwater vegetation by cutting and delivering it hydraulically to the surface but, insofar as I am aware, none have been found commercially successful. For example, I am aware of the apparatus described in the earlier United States Letters Patent No. 1,571,395 to Clark; U.S. Pat. No. 2,320,283 to Knowlton et al.; U.S. Pat. No. 2,629,218 to Smith; and U.S. Pat. No. 2,907,162 to Rebikoff. However, despite such attempts, it remains the fact that, today, about 75 percent of the world's Irish Moss harvest is simply collected along the beach where it is storm-cast, and virtually the remainder is harvested manually at low tides only in the warmer months of the year, using rakes or perhaps oyster dragging techniques. Such raking rips the plants and their hold fasts from the rocks, and may destroy lobsters and other shellfish which commonly habitate the plant beds.

Proper cutting of the *chondrus* as it grows, as compared with raking either underwater or on shore, would not only avoid injury to the plant hold fast and to other marine life, but also would result in a harvest which is more predictable in amount, and more uniformly free from foreign matter such as other weeds and the like. In addition, the number of persons utilized in the harvesting work force and their duties would be more readily determinable, and would not be subject to wide variation. This is believed true because the use of proper diving equipment and effective cutting apparatus would permit divers to work at all stages of the tide even in localities such as Maine and Nova Scotia where large tidal ranges are common, and to remain at working depth for relatively long periods of perhaps from 2 to 3 hours, even in very cold weather. The manual raking and other underwater harvesting methods currently used are difficult to conduct while wearing and using such proper diving equipment.

It is intended by the present invention to achieve these ends by providing such apparatus for mechanically cutting marine vegetation as it grows underwater, and for automatically collecting and conveying the cut vegetation to the surface as it is cut. The collection and conveying to the surface of the cut plants is intended to be substantially immediate and complete, so that they will not float loosely and thus cause murkiness of the water and consequent interference with the working diver. In addition, the apparatus must be dependable and effective in operation, yet not unwieldy so that it can be easily used and manipulated by a diver working underwater. The cutting unit should be motorized, and should not require a great degree of accuracy of manipulation to avoid damage either to the hold fasts of the plants themselves or to other marine life which it is desired to preserve. Moreover, it is intended by the invention to provide underwater harvest apparatus whose production capability is limited only by the rate at which the worker can bring the cutting blade into contact with the vegetation being harvested.

Regarding rates of production, it may be said generally that a crew of four to six men working underwater can manually rake about 500 lbs. per six hour day, and the harvested weed can be cleaned, dried and baled ready for sale at the rate of about 2½ tons per hour using current methods. By contrast, instead of the some 60 work crews of up to six men each as are currently required per shift to sustain the capacity of the drying and baling operations, using the present invention it appears that a single work crew of only three or four men including only one diver, working at any stage of the tide, even at a depth to about 40 feet, can harvest a minimum of about 2 dry tons in a 6 hour shift. Thus, only seven or eight work crews, of not more than four men each, can service the same drying and baling operation. Because of the rapid rate at which the cutting and collecting proceeds, it becomes profitable to conduct the operations during all seasons of the year, even at times when cold temperatures may limit the duration of each continuous stay of the worker on the ocean bottom.

In general, apparatus in accordance with the invention comprises a manually maneuvered, motorized underwater cutting unit having a sickle bar cutting blade and a hood providing a confined suction area for entrance of the cut weed into a flexible delivery line which is attached to the hood and leads to the surface via an airlift which powers the hydraulic delivery system. As is known, an airlift is a tube to which air is introduced through its sidewall to reduce the specific gravity and thus increase the buoyancy of the combined air and water fluid therein, thus inducing upward movement of the fluid. In a modified arrangement, one airlift is made to serve two divers using separate cutters respectively at the ends of a pair of such delivery lines leading to the airlift, from whence the combined output is delivered to the surface via a single, larger line or pipe. From the top or outlet of the discharge pipe from the airlift, the weed discharges into a net or strainer located either alongside the small boat or the like from which the harvesting operation is conducted, or within the boat. In the latter instance, the discharge pipe leads directly into the boat through its bottom or from over its side.

To improve the mobility of each cutting unit the airlift is spaced a considerable distance away from the locations of the one or more cutters which are used. Moreover, as is believed to improve its operating efficiency, the airlift is positioned just below the surface of the water (e.g., at a depth of about 10 feet, more or less), it being suspended from the operations boat. Contrary to expectations based upon the commonly accepted theories that an airlift should operate from as close to the source of the collected material as possible, and from as great a depth as possible, it has been found that the suction and flow rate of the airlift, at least for such harvesting purposes, are not diminished by its disposition at even a considerable distance away from the source of the materials to be conveyed, and are actually improved by its disposition near the surface of the water. This improvement in suction and flow rate is thought to be due to elimination of air lock conditions in the airlift and its discharge line as would be caused by very rapid expansion of relatively large air bubbles as they rise within the delivery tube and discharge hosing of an airlift disposed at greater depth.

The airlift used in connection with the present invention is somewhat conventional in that compressed air is admitted peripherally into the hydraulic delivery tube from a surrounding air jacket or plenum, the air passing through peripherally disposed air holes in the delivery tube wall within the region of the jacket. However, in accordance with the preferred embodiment of the invention, numerous small holes are employed, rather than a few larger holes, and the total area of these openings is some 50 percent larger than the cross-sectional delivery area of the delivery tube itself. The improved operating results are believed due to the thus permitted rapid expansion of the compressed driving air as it is emitted from the jacket into the delivery tube. The more numerous, relatively small bubbles apparently induce movement of a greater quantity of water for a given volume of air. In addition, the axes of the air holes through the delivery tube are inclined 20° upwardly from the horizontal (with relation to the airlift in its vertical position as used), which further appears to improve the operation of the airlift.

Regarding the cutting unit, whereas previously it was thought that the rate of cutting would increase proportionately with an increase in the length of the cutting blade, it has been found that there exists an optimum proportioning between the length of the cutting blade and the power, and therefore the size of the motor which drives it. Thus, the length of the blade should be kept relatively short, i.e. up to about 14 inches, the preferred embodiment having a blade which is 8½ inches long. In addition, it has been found that the relatively short length cutting blade avoids clogging of a 3 inch diameter delivery tube whose capacity, considering the rate of delivery afforded by the airlift, would then be exceeded. For a comparatively high rate of delivery yet for convenience in handling during such underwater operations, the use of 3 inch diameter hose is presently considered optimum.

The forwardmost edges of the oscillating blade of the sickle bar cutter are set behind the forwardmost edges of its fixed blade component for safety. A base plate, though not essential, is preferably disposed under the cutting blade to act as a spacer to facilitate cutting of the plant uniformly at a height of about 1 inch above its hold fast. The cutting blade may have a double edge for essentially continuous cutting as the unit is moved from side to side. The blade is covered by a fairly close fitting metal hood to which the flexible-hose tubing of the hydraulic delivery system is attached. In one embodiment the hood is formed by a plate disposed parallel to, and about 2 to 3 inches above the plane of the blade, the plate having relatively narrow (i.e., about ½ inch to ¾ inch) turned down side edges which lie immediately above the areas of entrance to the blade from either side of the cutter, and a vertical end plate which closes off the forward end of the cutter. The area beneath the cutter is open. In other embodiments, the base plate extends along and closes the underside of the cutter, the hood extending upwardly from the base plate and, excepting for a rectangular entrance area about 2 to 4 inches high extending in front of its cutting edge, surrounding and substantially enclosing the cutting blade. In the latter embodiments, the flexible-hose tubing of the hydraulic delivery system is attached to the rear or back plate of the hood. Thus, the area of entrance to the delivery system, as defined by the hood, is confined to a region which substantially surrounds the blade, such that the hydraulic suction exerted by the delivery system is more effective. Moreover, as compared with the "pusher" type blade orientation of the referred to prior art patents, it is found that a blade orientation affording side-to-side or lateral cutting movement facilitates its use. Although an electric motor might be used to drive the sickle bar cutting blade, an air motor has been found to be most effective, especially when an O-ring packing is employed around its drive shaft to prevent even minimal air leakage. The air motor is dependable, light in weight, and develops adequate torque with low power requirements.

The air for driving both the cutter motor and the airlift of the hydraulic conveyor is furnished from an air compressor on board the boat from which the operations are conducted. The compressor also supplies air to the diver, if scuba tanks are not used. Although the exhaust air from the cutter motor might be introduced into the air supply jacket of the airlift to cause the latter to function, for the purpose of reducing back pressure on the motor it is preferable that its air exhaust be exhausted directly to the atmosphere by a separate air line. Thus, in the preferred embodiment of the apparatus to be described, the airlift is powered by a separate air line extending from one of the volume tanks of the air compressor; the cutting unit motor is powered by another air line extending from the same volume tank; and still another air line leading from a second volume tank furnishes breathing air to the diver.

Thus, rather than attempting to enlarge the cutting unit for increasing the rate of harvest as seems to have been the premise of the prior art, and which requires commensurately increased motor and pumping power, by the present invention the rate of harvesting is improved by using a smaller cutter whose blade size and hood arrangement is selected with relation to the necessarily limited size of the air-motor required to power a light-weight, easily manipulated cutting unit, and with relation to the available rate of delivery of a light-weight, easily manageable hydraulic conveyor system driven by an airlift rather than by a trash pump. The airlift delivers effectively, using smaller size and therefore more maneuverable lines. Moreover, the airlift is spaced away from the cutting unit to facilitate manipulation of the latter, and close to the surface of the water to improve airlift efficiency.

These and other objects, features and advantages of the invention will become more fully apparent from the following detailed description thereof, when taken with reference to the accompanying drawings, in which:

FIG. 3 is an enlarged perspective view, partially fragmented, of only the airlift and discharge piping components of the apparatus;

FIG. 4 is a further enlarged and partial cross-sectional side elevation of the airlift apparatus, as seen from line 4—4 in FIG. 3;

FIG. 5 is a cross-sectional plan view as seen from line 5—5 of FIG. 4;

FIG. 6 is an enlarged perspective view of only the cutting unit component of the apparatus of the invention, in its preferred form;

FIG. 7 is a sectional perspective view as seen from line 7—7 in FIG. 6;

FIG. 8 is a somewhat further enlarged cross-sectional view as seen from line 8—8 in FIG. 7;

FIG. 9 is a similarly further enlarged but fragmentary cross-sectional plan view of the cutting unit as seen from line 9—9 in FIG. 6;

FIG. 10 is a perspective view of a modified form of the cutting unit component;

FIG. 11 is a perspective view of still another modified form of the cutting unit component; and FIG. 12 is a perspective view, to a smaller scale, of another embodiment of the cutting unit component.

Figure 1:
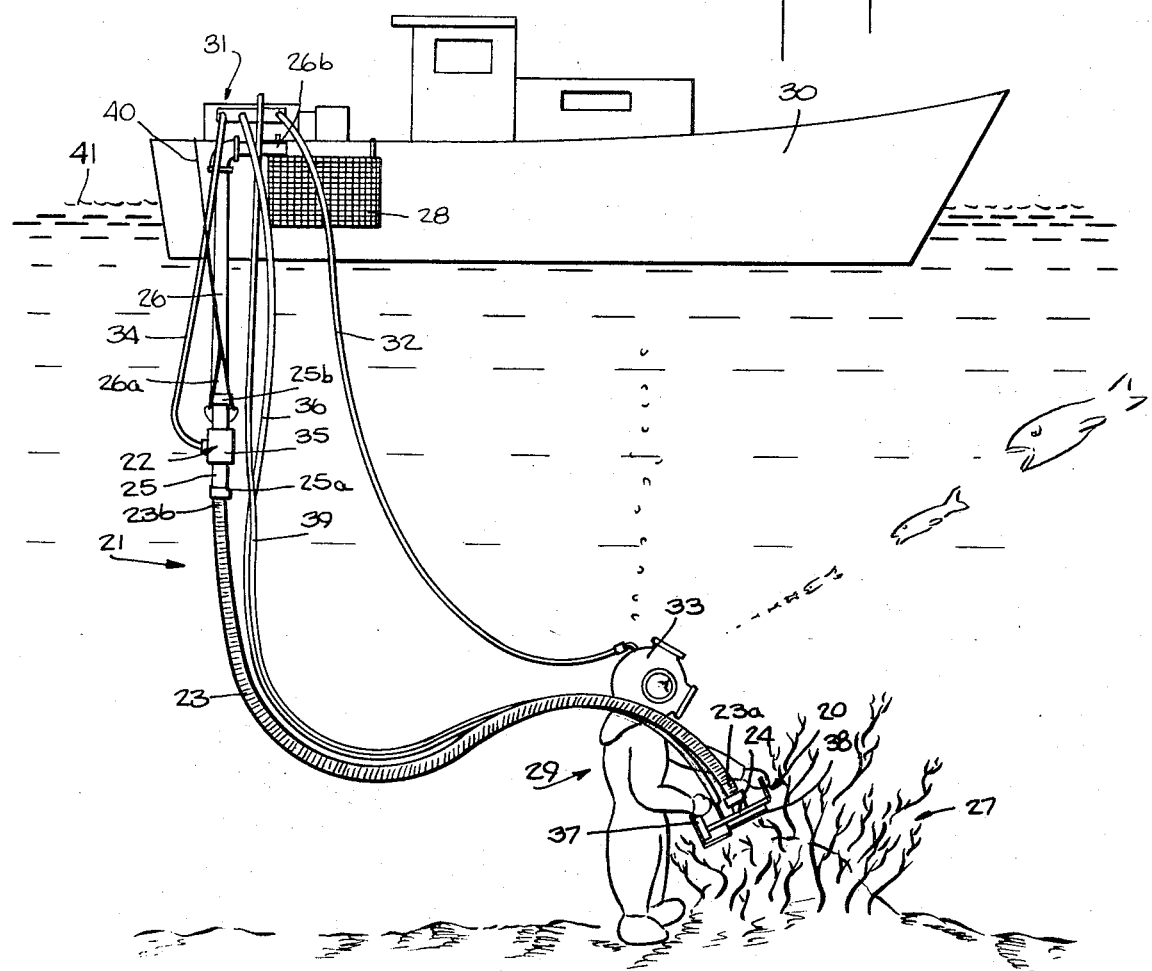
FIG. 1 is a pictorial showing of one form of sea harvest apparatus and its use in accordance with the invention.

Referring first to FIG. 1, sea harvest apparatus in accordance with the invention generally comprises a portable, motorized underwater cutting unit as generally indicated by reference numeral 20, and an hydraulic conveying system as generally indicated by reference numeral 21. Referring particularly to FIG. 3 as well as FIG. 1, the conveying system comprises an airlift generally indicated by reference numeral 22, a flexible delivery hose 23 having its inlet end 23a attached to the collecting hood 24 on the cutting unit 20 and its outlet end 23b attached to the inlet end 25a of the airlift delivery tube 25, and an airlift discharge pipe 26 whose inlet end 26a is attached to the outlet end 25b of the airlift tube 25 and from whose outlet or discharge end 26b the harvested marine vegetation (generally indicated in FIG. 1 by reference numeral 27) is spewed into a collection strainer 28. The cutting unit 20 is guided and manipulated by a diver 29 operating from a surface station such as a boat 30. The boat carries an air compressor as generally indicated by reference numeral 31, one of whose volume tanks (not shown) furnishes breathing air through the air line 32 to the diving helmet 33 on the suit of the diver 29. The compressor 31 has another volume tank (not shown) for furnishing airlift operating air through the air line 34 to the cylindrical air jacket 35 which surrounds and forms a part of the airlift 22. Another air line 36 from the air compressor 31 supplies air to power the air motor 37 which drives the reciprocating sickle bar cutter 38 of the cutting unit 20. Another air line 39 conveys the air which is exhausted from the air motor 37 back to atmospheric discharge.

The airlift 22 and its discharge tube 26 are hung from the side of the boat 30 and are secured, as by a line 40, the discharge tube 26 having length such that the air jacket 35 of the stationary airlift is positioned at a depth of from about six feet to ten feet below the water surface 41.

In an alternative embodiment (not shown) the air motor exhaust line 39 does not lead to the atmosphere but is connected to the airlift jacket 35 so that this exhaust air, rather than air received directly from the compressor 31 through line 39, drives the airlift. However, it is believed that such utilization of the air motor exhaust air reduces the operating efficiency of the air motor because of back pressure within the line, and therefore this alternative embodiment does not appear to be preferable to the principal embodiment wherein the motor air exhaust line 39 exhausts to atmospheric pressure.

Figure 2:
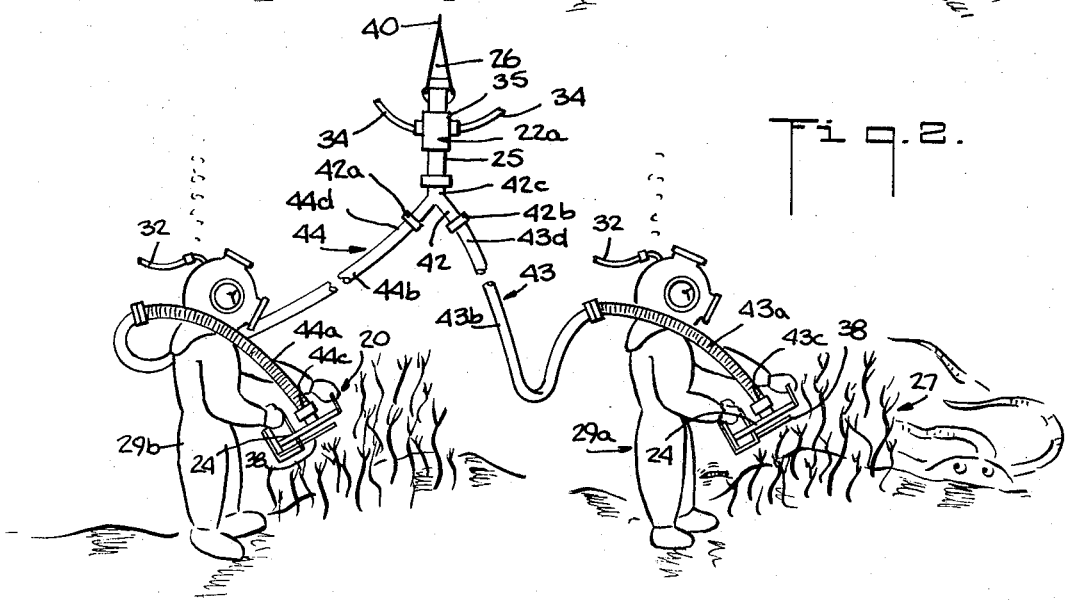
FIG. 2 is a similar, but fragmentary pictorial showing of a modified form of apparatus and its use in accordance with the invention.

FIG. 2 illustrates an arrangement of the apparatus by which an airlift 22a is used to convey to the surface the production of two divers 29a and 29b, who work independently of each other. That is, the lower end of the delivery tube 25 is attached to the stem branch 42c of a Y-type reducing coupling 42, the Y-branch openings 42a, 42b of which are attached to the respective delivery hoses 43 and 44, as shown. Whereas the entire length of the delivery hose 23 as shown in FIG. 1 is made of a highly flexible hose (such as spiral-wire reinforced, thin rubber hose), only a three foot length 43a or 44a of the respective delivery hoses 43 and 44 is made from such relatively expensive and more easily damageable highly flexible hose, the major lengths 43b and 44b being made of more rugged but less flexible fabric-reinforced rubber hose.

For cutting different varieties of marine plant life, further alternative embodiments of the invention are afforded by substitution of any of the cutting units shown in FIGS. 10, 11 or 12 for the cutting unit 20 illustrated in FIGS. 1, 2 and 6-9.

In the underwater harvesting operation the diver 29 cuts the plants 27 using a side-to-side sweeping movement of the cutting unit 20, keeping the sickle bar cutter 38 about 1 inch or so above the roots or "hold fasts" of the plant stalks. As the plants are cut they are promptly sucked into the hydraulic conveyor system 21. Movement of water and the cut plants upwardly through the hose 23 (or 43, 44) is induced by the introduction of air from the air supply line 34 into the airlift manifold or jacket 35, from which the air passes into the delivery tube 25 of the airlift. As is well known, such introduction of air produces an upward flow of water within the hydraulic delivery system 21, which conveys the cut plants to the collecting basket or strainer 28.

Turning now to the details of the apparatus and the manner of its use, reference will first be made to the airlift 22 and its discharge pipe 26 as shown in FIGS. 3-5. The airlift is formed by a delivery tube 25 having an exterior, peripherally extending, cylindrical jacket 35 which is brazed top and bottom, as at 35a and 35b, to the delivery tube 25 to thus define an air plenum chamber 35c which surrounds a middle-length portion of the delivery tube. At each of its ends 25a and 25b the delivery tube 25 has respective threaded couplings 25c, 25d for attachment of the outlet end 23b of the flexible delivery hose 23 and of the inlet end 25a of the discharge pipe 26, as seen in FIG. 3. At its upper or outlet end 25b the delivery tube 25 has a pair of handles 45, for convenience in grasping the airlift and for attachment of the line 40 (see FIGS. 1 and 2) by which the airlift is suspended in its submerged, fixed operating position from the side of the boat 30. In addition, the air jacket 35 has a pair of hose connectors 46, on either side thereof, each for connection of an air supply hose 34, as shown in FIG. 2. Only one air supply hose 34 is shown as being attached in FIGS. 3 and 4, the other connector 46 being sealed by a cap 46a. The connectors 46 communicate with drilled holes 35d which extend through the jacket into the air plenum 35c. All of the elements of the airlift 22 are preferably made of non-ferrous metal such as brass, or of suitable plastic material.

Regularly spaced rows and columns of air holes 47 are drilled through the wall of the delivery tube 25 within the cylindrical wall area beneath the jacket 35, thus permitting the air from the plenum 35c to be introduced into the tube 25. The air holes 47 are formed by drilling using a No. 49 (0.0730 inch diameter) drill, the drilling being radially inward and at an upward slant angle ($\alpha$) of 20° with respect to the horizontal when the airlift 22 is in its vertical operating position, as shown in FIG. 4. In addition and as indicated in FIG. 3, each of the annularly spaced apart vertical columns of equally spaced holes 47 is displaced vertically, alternately upward and downward, with respect to its adjacent column of holes by a distance equal to one-half the vertical spacing between any two holes in a column. Thus, the pattern of all of the holes 47 may be characterized as "staggered." In addition, the sum of the cross-sectional areas of all of the plurality of holes 47 is equal to about 50 percent more than the cross-sectional area of the interior of the delivery tube 25 to facilitate flow of the air into the delivery tube 25 and thus avoid build-up of back pressure in the plenum 35c, air supply tube 34, and ultimately the compressor 31, as would adversely affect the operation of the latter.

As shown in FIGS. 1 and 3, the discharge pipe 26 includes a 90° elbow 48 attached at the upper end of its vertical portion 26c that the horizontally extending outlet end 26b conveniently delivers the hydraulically conveyed cut moss or weed into the strainer 28 (FIG. 1) on which the outlet end 26b rests or is otherwise secured. The discharge pipe is also made of non-ferrous metal such as brass, or of suitable plastic material, and is about 10 feet long such that the jacket 35 of the airlift 32 is disposed at about that depth below the surface 41 of the water during operation. The airlift should operate at a preferred depth of from about 6 to 10 feet, as has been found to improve its rate of flow and suction efficiency.

Although larger or smaller sizes might be used, the airlift delivery tube 25 an the discharge pipe 27 in the embodiment shown in FIG. 1 are each nominally 3 inches in diameter, and the airlift jacket 35 is made from 3½ inches nominal diameter pipe. The preferred diameter of the suction or delivery hose 23 is nominally 3 inches when the hose services only one diver as shown in FIG. 1. Similarly, the preferred diameter of each of the hoses 43, 44 is nominally 3 inches when two suction hoses are being operated through a single airlift having a 4 inch diameter airlift delivery tube and discharge pipe as illustrated in FIG. 2, or 2 inches when operated through a single 3 inch airlift delivery tube and discharge pipe, the sum of the areas of the hoses 43, 44 being approximately equal to the area of the airlift delivery tube.

The diameter of the rubber air supply hose 34 which delivers air from the compressor 31 to the airlift plenum chamber 35c is ½ inch or ¼ inch, depending upon whether, respectively, one or two of the air supply hoses 34 are connected to the airlift jacket, as will be understood from a comparison of FIGS. 1 and 2. The air for powering or driving the airlift is delivered from the air compressor 31 at a pressure of from as little as 10 pounds per square inch (p.s.i.) to as high as 100 p.s.i., depending upon the desired rate of operation of the airlift. However, the preferred range is between 10 p.s.i. and 40 p.s.i.

Considering the depth of water in which Irish Moss or any other marine vegetation 27 may be found, the lengths of the delivery hoses 23, 43, and 44 may be made anywhere from about 10 feet to about 100 feet or more. The preferred length is 20 feet. Similarly, the lengths of the standard diver's supply hose 32, the ¼ inch air motor supply hose 36, and the air motor exhaust line hose 39 are each determined by the working depth and range of operation outwardly from the boat 30 of the divers 29, 29a, and 29b.

Referring now to the details of the cutting unit 20, its preferred form is illustrated in FIGS. 6–9. The sickle bar cutter 38 of the unit is double edged, as most clearly seen in FIGS. 7–9, for cutting the plant stalks as the unit 20 is moved laterally in either direction. The cutter 38 has a movable cutting blade 38a which reciprocates in forward and rearward direction, as indicated by the arrows in FIG. 7, with respect to the fixed blade portion 48b therebelow. As will be best understood from FIG. 8, the path of movement of the cutting blade 38a is confined between the fixed blade portion 38b and a top guide 50 which extends along the length of the cutting blade 38a and supported by, and in vertically spaced relation to the fixed blade portion 38b by the cylindrical spacers 51 and the bolts 52 at the respective ends thereof. The cutting blade 38a is appropriately slotted, as at 53, for clearance of the respective vertical spacing elements 51. Thus, the reciprocating action of the cutting blade 38a with respect to the fixed blade portion 38b provides scissorlike cutting action between the respective laterally directed cutting edges 38c and 38d. The width of the cutting blade 38a is less than that of the fixed blade portion 38b so that the laterally projecting ends 38e of the blade edges (see FIG. 9) are set back from the ends 38f of the fixed blade portion 38b for safety during operation of the cutter.

The sickle bar cutter 38 projects forwardly from, and is driven by a rotary air motor 55 which receives its driving air through the air supply line 36 and which exhausts through the air exhaust line 39. A manually operated valve 56 (FIG. 6) in the supply line 36 can be operated by the diver to control the rate of air flow. In its preferred form the motor 55 delivers up to ¾ horsepower (hp) at any pressure up to 100 p.s.i., and weighs only about 5 pounds. Its vertically downward projecting drive shaft 57 has surrounding packing, such as O-ring packing (not shown) to prevent even minimal leakage of air. As best understood from FIGS. 7 and 9, the motor shaft 57 has an attached sleeve 58 which carries an eccentrically located roller type cam follower 59. The cam follower 59 works within an elongated, laterally oriented cam slot 60 formed within the rearward end portion 61 of the movable cutting blade 38a.

The length of the cam slot 60 corresponds with the diameter of the sleeve 58, so that, as the motor shaft 57 rotates, the orbiting cam follower effects forward and rearward reciprocating motion of the cutting blade 38a.

The corresponding end of the fixed blade portion 38b is attached to a horizontal base plate 62 beneath the air motor 55, as shown. The base plate 62 as it extends below the cutting plane of the cutter 38 projects about 1 inch to function as a guide to te diver in cutting plant stalks at a height of about an inch or so above their hold fasts, as previously mentioned. The opposite end of the fixed blade portion 38b is attached to a vertical end plate 63 (FIGS. 6 and 9), which similarly projects about 1 inch below the level of the cutting plane when the cutter is in use, for the same purpose.

The end plate 63 mounts the handle 64 which, as has been found convenient, extends in the lateral direction of the cutter. Another handle 65 extends longitudinally over the motor 55, and is attached between the base plate 62 at one side thereof and a laterally extending support piece 66 at the other side thereof, as shown. The lateral support piece is secured to the block-elbows 67 by which air is admitted to and exhausted from the motor 55, as shown in FIG. 6. The motor 55 is supported in its vertically spaced relationship above the base plate 62 by the vertical side plates 68, the flat plates 69 thereabove, and the end plate 70 which enclose three sides of the cam area below the motor.

Collection of the cut weed and its entrance into and delivery up through the flexible delivery hose 34 (FIG. 6) is facilitated by the collecting hood 24 which extends over and along the length of the cutter 38 between the vertical support plates 68, 69 and the vertical end plate 63 at the opposite end of the cutter. In the preferred embodiment being described, the collecting hood 24 is in the form of a flat plate having downwardly turned side edges 24a on either side thereof, the height of the edges 24a being about ¾ inch. The hood 24 is in fixed position extending along the length and at a height above the cutter 38 such as to provide a narrow side area about 2 inches high, as measured between the cutting plane and the underside of the hood edge 24a, on each side of the cutting unit 20. It will also be noted that the width of the hood 24 is greater than that of the cutter 38, such that it projects laterally about one inch outwardly beyond the ends 38f of the fixed blade portion 38 b. In the preferred embodiment of the invention the length of the cutter 38 as it extends between the base plate 62 and the end plate 63 is 8½ inches, although the cutter length might be as short as 6 inches or as long as about 14 inches, or perhaps 20 inches.

The flexible delivery hose 23 is attached to a suitably threaded coupling 72 which is attached to the top of the hood 24, the hood being cut away within the area of the coupling 72 to provide flow communication from the region below the hood 24 to within the hose 23. Thus, it will be understood that, as the plant stalks are cut by the sickle bar cutter 38 they are already within a confined collection area, as defined by the underside of the hood 24, its side edges 24a, the end plate 63, and the opposite end plates 70 and 68, 69 at the motor end of the cutter, within which the hydraulic suction of the tube 23 is effectively exerted. The plants are therefore entrapped immediately upon being cut, and delivered upwardly through the delivery tube 23. Their rate of upward movement is determined by the rate of operation of the airlift 22 (FIGS. 1 and 2), and is equal to or greater than the possible rate at which a diver can cut the plants using a side-to-side sweeping motion of the cutting unit 20, as previously described. In this connection, the speed of the motor 55 may be varied from a slow speed of about 300 rpm to a maximum of 3,000 rpm, and tube 23 has diameter up to 4 inches.

Referring to the respective cutting unit embodiments 80, 90 and 100 as shown in FIGS. 10–12, it will be noted that each has a horizontally disposed base plate 81, 91 and 101, respectively, which supports the respective air motors 82, 92 and 102 via support means such as the base plate end posts 81a, 91a and 101a. The motors 82, 92 and 102 are of the same type and have the same characteristics and ratings as the motor 55 in the previously described embodiment. They are similarly driven by compressed air through the respective air supply lines 83, 93 and 103 which have flow control valves 83a, 93a and 103a respectively. Each has an air exhaust line 84, 94 and 104, respectively. However, it will be noted that the respective drive shafts 82a, 92a and that of the motor 102 (not shown) are disposed horizOntally and parallel to the respective sickle bar cutters 85, 95 and 105, rather than vertically as in the previous embodiment. Through respective clutches 86, 96 and 106 the drive shafts are connected respectively to motion translater devices 87, 97 and 107 to which the movable cutting blades of the cutters 85, 95 and 105 are also connected. These devices are appropriate mechanisms (not shown) for translating the rotary drive shaft motion to the desired reciprocating motion of the sickle bar cutter. At their opposite ends the motors 82, 92 and 102 have handles 82b, 92b and 102b for grasping during use.

Each of the units 80 and 90 has a second handle attached to the respective base plates 81 and 91 and extending at an angle to the longitudinal direction of the unit, as shown. In the FIG. 12 embodiment the support 108 for the flexible suction hose 23, or the cylindrical hose coupling 109 attached to and extending through the end plate 110a of the hood 110, may be grasped as a second handle during use.

Completing the description of the FIG. 12 embodiment, the semicylindrically curved hood 110 includes a second vertical end plate 110b which encloses the combined collecting region beneath the hood, and to which the forwardly projecting end of the sickle bar cutter 105 is attached. The hood 110 extends from the cutting plane of the cutter 105 at its opposite side to a location about 4 inches above the same cutting plane at the left side of the cutting unit 100 as shown in FIG. 12, thus providing a narrow side area, which is defined by the vertical end plates 110a, 110b, the downwardly turned lip 110c along the top of the areas, and the cutting plane, and through which the cutter 105 is exposed. It will be noted that the hood 110 is wider than the cutter 105. The usable length of the cutting blade of the cutter 105 is 6 inches.

The hood 98 of the cutting unit 90 as shown in FIG. 11 is somewhat differently shaped, having a back plate 98a disposed at a slant angle of 20° from the vertical. Thus, the central longitudinal axis of the cylindrical hose connector 99, which is attached to and passes through the back plate at a location midway along the length of the hood, is disposed at the same angle with respect to, and extending upwardly from the plane of the cutter 95. The usable length of the cutter 95 is also about 6 inches. The height of the open, narrow side area of the hood 98, as defined by the respective inwardly turned vertical edges 98b, 98c which form lips at the respective ends of the area, the outwardly turned lip 98d along the top thereof, and the cutting plane of the cutter 95 is about 4 inches. The width of the hood 98 is greater than that of the cutter 95.

FIG. 10 shows a modified form of hood 88 in which the cutting unit base plate 81 extends fully along the length of the unit to enclose the bottom of the hood. The height of the narrow side area between this forwardly extended portion of the base plate 81 and the lower edge of the downwardly turned lip 88a of the horizontally disposed top 88b of the hood is about 3 inches. The usable length of the cutter 85, as it is exposed between the inwardly turned vertical edges 88c and 88d of the hood, which form lips at the respective ends of the area, is 14 inches, which length has been found especially useful in cutting taller plants, such as agar weed, which may be two feet tall when cut. The hose connector 99 extends through the closed, opposite side of the hood, and is substantially horizontal.

All of the cutting units 20, 80, 90 and 100 as have been described are used in essentially the same manner by the diver, i.e., by moving them laterally into contact with the growing vegetation. As previously noted, the cutting unit 20 has a double-edge cutter so that it will also cut on the return sweep and, thus, the diver should be able to walk forward more rapidly as he works. The flexible hose 23 is easily kept clear, and any of the cutting units will be found to be light in weight and easily maneuvered.

Thus has been described a method and apparatus for underwater harvesting of marine vegetation which achieves all of the objects of the invention.

What is claimed is:

1. Apparatus for harvesting marine vegetation or the like, comprising a portable motor-driven underwater cutting unit for cutting said marine vegetation, an airlift, a delivery hose having a length of at least about 10 feet for receiving and conveying said cut vegetation, at least a portion of the length of said delivery hose being highly flexible and providing an inlet end of the delivery hose connected to said cutting unit, said delivery hose having an opposite end connected to said airlift, and means for introducing air into said airlift for driving the same.

2. Apparatus according to claim 1 wherein said delivery hose has a length of between about 20 feet and about 100 feet, said airlift includes a delivery tube having one end to which said opposite end of said delivery hose is attached and an opposite end carrying an attached discharge pipe, and said cutting unit comprises a submersible air motor and a cutter connected in driven relation thereto, and a hood over said cutter permitting contact of the latter with said marine vegetation but providing a confined region generally above said cutter for collecting said vegetation, said delivery hose inlet end being connected to said hood.

3. Apparatus according to claim 1, wherein said cutting unit comprises a portable underwater type motor, an elongated bar type cutter projecting outwardly substantially from said motor in the direction of elongation of said cutter and having a horizontally disposed and laterally directed cutting blade, means connecting said motor and said cutter for driving the latter reciprocally in said direction of elongation of the cutter, and a hood extending along substantially the length of said cutter and in laterally spaced relation thereabove to provide a zone of suction concentration as exerted by said delivery hose adjacent to said cutting blade.

4. Apparatus according to claim 2 wherein said cutter is of the reciprocating, elongated sickle bar type, and said hood has means defining a narrow side area along substantially the length of said cutter through which a cutting blade is exposed for contacting said marine vegetation to be cut.

5. Apparatus according to claim 4 wherein said cutting blade is double-edged presenting blade edges on laterally opposite sides thereof, said hood having means defining a narrow side area along substantially the length of said cutter on each side thereof through which the respective of said blade edges are exposed for contacting said marine vegetation to be cut.

6. Apparatus according to claim 1 wherein said cutting unit comprises a portable underwater type motor, an elongated sickle bar type cutter having length between about 6 inches and about 20 inches and projecting outwardly substantially from said motor in the direction of elongation of said cutter for cutting said vegetation, said cutter further having a horizontally disposed and laterally directed cutting blade, means connecting said motor and said cutter for driving said cutting blade and the latter with reciprocating motion in said direction of elongation of the cutter, and a hood extending substantially the length of said cutter and in spaced relation therewith to provide a zone adjacent to said cutting blade for collecting said cut vegetation, said hood having means defining a narrow side area along substantially the length of said cutter through which said cutting blade is exposed for contacting said marine vegetation to be cut.

7. Apparatus according to claim 6 wherein said motor is an air motor, and said cutting unit further comprises a horizontal base plate, means mounting said motor on said base plate, means connecting said motor to said cutting blade to effect said reciprocating cutting movement thereon, a vertical end plate attached to and supporting the outwardly projecting end of said cutter, said hood being attached substantially to said vertical end plate and extending substantially to said motor, said hood being spaced above said cutter a distance of about 2 inches and about 4 inches, and handle means for grasping and manipulating said cutting unit.

8. Apparatus according to claim 7 wherein said cutting blade is double-edged presenting blade edges on laterally opposite sides thereof, and said hood comprises a substantially flat plate having downwardly turned side edges to define respective side areas between said cutter and said hood through which each of said blade edges is respectively exposed, and said delivery hose inlet end is attached to said hood at a middle location along the length thereof.

9. Apparatus according to claim 1 wherein said airlift comprises a delivery tube having an inlet end and an outlet end, a substantially cylindrical jacket defining an enclosed air plenum extending peripherally about said delivery tube along at least a portion of its length, means for admitting compressed air into said air plenum for driving said airlift, and means defining a plurality of peripherally spaced apart air apertures through said delivery tube within the region under said jacket for admitting said air from said plenum into said delivery tube, the sum of the cross-sectional areas of said plurality of apertures being 50 percent larger than the cross-sectional area of the interior of said delivery tube, said opposite end of said delivery hose being connected to said inlet end of the delivery tube.

10. Apparatus for cutting submerged marine vegetation or the like comprising a portable underwater type motor, an elongated sickle bar type cutter having length between about 6 inches to about 20 inches and projecting outwardly substantially from said motor in the direction of elongation of said cutter for cutting said vegetation, said cutter further having a horizontally disposed and laterally directed cutting blade, means connecting said motor and said cutter for driving said cutting blade of the latter with reciprocating motion in said direction of elongation of the cutter, a hood extending substantially the length of said cutter and in spaced relation therewith to provide a zone adjacent to said cutting blade for collecting said cut vegetation, said hood having means defining a narrow side area along substantially the length of said cutter through which said cutting blade is exposed for contacting said marine vegetation to be cut, and means on said hood for connecting a flexible delivery hose to receive and convey said cut vegetation from said zone.

11. Apparatus according to claim 10 wherein said hood has a downwardly projecting edge portion providing a lip extending along the top of said narrow side area.

12. Apparatus according to claim 11 wherein said hood further has respective inwardly directed edge portions providing a generally vertical lip at each of the respective ends of said narrow side area.

13. Apparatus according to claim 10 wherein the width of said hood is greater than that of said cutter.

14. Apparatus according to claim 10 wherein aid motor is an air motor, and which further comprises a horizontal base plate, support means extending upwardly from said base plate and mounting said otor with its drive shaft extending vertically downwardly to adjacent said base plate, cam and cam follower means connecting said motor drive shaft to said cutting blade of said cutter to effect said reciprocating cutting movement thereof, a vertical end plate attached to and supporting the outwardly projecting end of said cutter, said hood being attached substantially to and extending between said support means and said vertical end plate, said hood being spaced above said cutter a distance of between about 2 inches and about 4 inches, handle means attached adjacent to said vertical end plate, and handle means attached adjacent to said motor.

15. Apparatus according to claim 14 wherein said cutting blade is double edged presenting blade edges on laterally opposite sides thereof, and said hood comprises a substantially flat plate having downwardly turned side edges providing a substantially vertical lip extending substantially along the length of and spaced generally above each of said respective blade edges to define respective side areas between said cutter and said hood through which each of said blade edges is respectively exposed for contacting said marine vegetation to be cut, said delivery hose connecting means being at a middle location along the length of said hood.

16. Apparatus according to claim 10 wherein said motor is an air motor, said length of said cutter is about 6 inches, said hood includes a substantially vertical end plate at the outwardly projecting end thereof and a substantially vertical end plate at its opposite end, said narrow side area having height of not more than about 4 inches above the plane of said cutter, and said means for connecting said delivery hose being on and extending through one of said vertical end plates.

17. Apparatus according to claim 10 wherein said motor is an air motor, said means for connecting said delivery hose is attached to and extends through said hood at a middle location along its length and on that side thereof which is opposite to said narrow side area, and said hood has respective edge portions providing a generally vertical lip at each of the respective ends of said narrow side area.

18. Apparatus according to claim 17 wherein said means for connecting said delivery hose provides a cylindrical passage through said hood which is inclined at an upward angle of substantially 20° with respect to the plane of said horizontally disposed cutter.

19. Apparatus according to claim 17 which further comprises a base plate supporting said motor, said cutter, and said hood, said base plate extending along the length of said cutter immediately therebelow and providing a bottom wall of said hood, and wherein said length of said cutter is substantially 14 inches, and said hood further has a downwardly projecting edge portion providing a lip extending along the top of said narrow side area.

20. Apparatus for hydraulically conveying cut marine vegetation or the like, comprising an airlift having a delivery tube, a substantially cylindrical jacket defining an enclosed air plenum extending peripherally about said delivery tube along at least a portion of its length, means for admitting compressed air into said air plenum for driving said airlift, and means defining a plurality of peripherally spaced apart air apertures through said delivery tube within the region under said jacket for admitting said air from said plenum into said delivery tube, delivery tubing having a length of at least about 10 feet for receiving and conveying said cut vegetation and having an inlet end for receiving said vegetation and an opposite end connected to one end of said airlift delivery tube, and a discharge pipe connected to the opposite end of said delivery tube.

21. Apparatus according to claim 20 which further comprises a Y-type pipe coupling having the stem branch of its Y-shape attached to said one end of said airlift delivery tube, said opposite end of said delivery tubing being connected to one of the Y-branches of said coupling, and a second length of delivery tubing having an inlet end for receiving said vegetation independently of the first said delivery tubing and an opposite end connected to the other of said Y-branches of said coupling.

22. Apparatus according to claim 20 wherein the length of said discharge pipe and that portion of said airlift delivery tube measured from said airlift jacket to its said opposite end is between about 6 feet and about 10 feet.

23. An airlift comprising a delivery tube, a substantially cylindrical jacket defining an enclosed air plenum extending peripherally about said delivery tube along at least a portion of its length, means for admitting compressed air into said air plenum for driving said airlift, and means defining a plurality of peripherally spaced apart air apertures through said delivery tube within the region under said jacket for admitting said air from said plenum into said delivery tube, the sum of the cross-sectional areas of said plurality of apertures being 50 percent larger than the cross-sectional area of the interior of said delivery tube.

24. An airlift according to claim 23, wherein said plurality of air apertures are arranged in rows and columns of apertures which are staggered with respect to each other in their spaced apart disposition peripherally about said delivery tube, and the diameter of each of said air apertures is on the order of about (0.0730 inch).

25. The method of hydraulically conveying cut marine vegetation or the like from a submerged location, comprising providing a delivery hose having length of at least 10 feet and further having an inlet end for receiving said cut vegetation and an opposite end attached to the delivery tube of an airlift device, positioning said airlift device with its air jacket is a depth of between about 6 feet and about 10 feet, introducing air into said airlift jacket for driving said airlift device, and bringing said marine vegetation and said inlet end of the delivery hose into close proximity with each other.

26. The method according to claim 25 wherein said delivery hose has a diameter of from about 2 inches to about 4 inches, and said air is introduced into said airlift at a pressure of between about 10 pounds per square inch (p.s.i.) and about 100 p.s.i. through an air supply line having nominal diameter of between about ¼ inch and about ½ inch.

27. The method according to claim 25 wherein said delivery hose is highly flexible along at least a portion of its length extending from its said inlet and, and which further comprises connecting a portable motorized cutting device to said delivery hose adjacent to its said inlet end and manually maneuvering said cutting device and flexible hose portion to cut said vegetation proximate to said delivery hose inlet end.

28. The method according to claim 27 wherein said cutting device comprises an elongated sickle bar cutter projecting outwardly from its drive motor and having reciprocating cutting motion in the direction of its elongation, said cutter having laterally directed cutting edges, and wherein said cutting device is manually maneuvered using substantially side-to-side sweeping motion with respect to said direction of elongation of the cutter.

* * * * *